(12) United States Patent
Ahn et al.

(10) Patent No.: US 12,069,243 B2
(45) Date of Patent: Aug. 20, 2024

(54) VIDEO ENCODING AND DECODING USING LUMA MAPPING CHROMA SCALING

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 95 days.

(21) Appl. No.: 17/924,898

(22) PCT Filed: Jun. 11, 2021

(86) PCT No.: PCT/KR2021/007321
§ 371 (c)(1),
(2) Date: Nov. 11, 2022

(87) PCT Pub. No.: WO2021/251787
PCT Pub. Date: Dec. 16, 2021

(65) Prior Publication Data
US 2023/0199169 A1 Jun. 22, 2023

(30) Foreign Application Priority Data

Jun. 11, 2020 (KR) .................. 10-2020-0071026
Jun. 11, 2020 (KR) .................. 10-2020-0071028
Jun. 10, 2021 (KR) .................. 10-2021-0075628

(51) Int. Cl.
*H04N 19/44* (2014.01)
*H04N 19/105* (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .. H04N 19/105; H04N 19/132; H04N 19/159; H04N 19/176; H04N 19/186; H04N 19/46
See application file for complete search history.

(56) References Cited

U.S. PATENT DOCUMENTS 11,290,713 B1    3/2022  Choi et al.
2022/0174275 A1  6/2022  Choi et al.

FOREIGN PATENT DOCUMENTS

WO    2020050607 A1    3/2020
WO    2020060258 A1    3/2020

OTHER PUBLICATIONS

Benjamin Bross et al., Versatile Video Coding (Draft 9); Joint Video Experts Team (JVET) of ITU-T SG 16 WP 3 and ISO/IEC JTC 1/SC 29/WG 11; Document: JVET-R2001-vA, 2020; 524 pp.
(Continued)

*Primary Examiner* — Jonathan R Messmore
(74) *Attorney, Agent, or Firm* — Lempia Summerfield Katz LLC

(57) ABSTRACT

The present disclosure intends to provide a video encoding/decoding method of performing intra prediction for a current block by using luma reference samples derived based on a luma mapping function in order to enhance performance of intra prediction for a case where restored samples around the current block to be predicted cannot be used.

16 Claims, 15 Drawing Sheets

(51) Int. Cl.
  *H04N 19/132* (2014.01)
  *H04N 19/159* (2014.01)
  *H04N 19/176* (2014.01)
  *H04N 19/186* (2014.01)
  *H04N 19/46* (2014.01)

(52) U.S. Cl.
  CPC ......... *H04N 19/176* (2014.11); *H04N 19/186* (2014.11); *H04N 19/46* (2014.11)

(56) References Cited

OTHER PUBLICATIONS

International Search Report and Written Opinion cited in corresponding international application No. PCT/KR2021/007321; Sep. 13, 2021; 11 pp.

J. Chen et al., Algorithm description for Versatile Video Coding and Test Model 8 (VTM 8); Joint Video Experts Team (JVET) of ITU-T SG 16 WP 3 and ISO/IEC JTC 1/SC 29/WG 11, Document: JVET-Q2002-v3, 2020, 97 pp.

Taoran Lu et al., CE12: Mapping functions (test CE12-1 and CE12-2); Joint Video Experts Team (JVET) of ITU-T SG 16 WP 3 and ISO/IEC JTC 1/SC 29/WG 11; Document: JVET-M0427-v2,2019; 16 pp.

VIDEO ENCODING AND DECODING USING LUMA MAPPING CHROMA SCALING

CROSS-REFERENCE TO RELATED APPLICATIONS

This application is a U.S. national stage of International Application No. PCT/KR2021/007321, filed on Jun. 11, 2021, which claims priority to Korean Patent Application No. 10-2020-0071026 filed on Jun. 11, 2020, Korean Patent Application No. 10-2020-0071028 filed on Jun. 11, 2020, and Korean Patent Application No. 10-2021-0075628 filed on Jun. 10, 2021, the entire disclosures of each of which are incorporated herein by reference.

TECHNICAL FIELD

The present disclosure relates to image (video) encoding and decoding. More particularly, the present disclosure relates to a video encoding/decoding method of performing intra prediction for a current block by using luma reference samples derived based on a luma mapping function in order to enhance performance of intra prediction for a case where restored samples around the current block to be predicted cannot be used.

BACKGROUND

The statements in this section merely provide background information related to the present disclosure and may not constitute prior art.

Since the volume of video data is larger than that of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and thus the amount of data to be encoded is also increasing. Accordingly, a new compression technique having better encoding efficiency and higher image quality than the existing compression technique is required.

In video encoding/decoding, a luma mapping function can be used to enhance the intra prediction performance of luma signals by reflecting cognitive perceptual characteristics of humans. In this case, intra prediction is performed in a mapped domain, and inter prediction is performed in an original domain. Prediction techniques related to the intra prediction perform prediction for a current picture by using reference samples. Therefore, when there are no available reference samples, an encoding/decoding method considering the luma mapping function is required in deriving the reference sample.

SUMMARY

The present disclosure intends to provide a video encoding/decoding method of performing intra prediction for a current block by using luma reference samples derived based on a luma mapping function in order to enhance performance of intra prediction for a case where restored samples around the current block to be predicted cannot be used.

Further, in signaling parameters for luma mapping chroma scaling (LMCS) related to the luma mapping function for one picture or slice, the present disclosure provides a video encoding/decoding method of managing a list of a parameter set based on a form and an identifier by signaling the form of corresponding parameters and the identifier for the form.

One aspect of the present disclosure provides a video decoding method for performing intra prediction for a current block, which is performed by a video decoding apparatus. The video decoding method comprises obtaining LMCS parameters, a first flag indicating whether LMCS is activated, and a second flag indicating whether chroma residual scaling is activated, from a bitstream. The LMCS converts the luma signals between an original area and a mapping area of a luma signal. The video decoding method also comprises generating luma residual signals and scaled chroma residual signals from the bitstream. The video decoding method also comprises generating a luma mapping function of converting a dynamic area of the luma signals by using the LMCS parameters when the first flag is activated. The luma mapping function indicates a first function of converting the luma signals into the mapping area or a second function of inversely converting the mapped luma signals into the original area. The video decoding method also comprises generating luma reference samples for the current block by using the luma mapping function when neighboring restoration samples of the current block are not available. The video decoding method also comprises generating luma predicted samples by performing intra prediction for the current block based on the luma reference samples. The video decoding method also comprises generating luma restoration samples by adding the luma predicted samples and the luma residual signals.

Another aspect of the present disclosure provides a video encoding method for a current block in a current picture, which is performed by a video encoding apparatus. The video encoding method comprises obtaining LMCS parameters, a first flag indicating whether LMCS is activated, and a second flag indicating whether chroma residual scaling is activated for the current picture. The LMCS converts the luma signals between an original area and a mapping area of luma signals. The video encoding method also comprises obtaining the current block. The video encoding method also comprises generating a luma mapping function of converting a dynamic area of the luma signals by using the LMCS parameters when the first flag is activated. The luma mapping function indicates a first function of converting the luma signals into the mapping area or a second function of inversely converting the mapped luma signals into the original area. The video encoding method also comprises generating luma reference samples for the current block by using the luma mapping function when neighboring restoration samples of the current block are not available. The video encoding method also comprises generating luma predicted samples by performing intra prediction for the current block based on the luma reference samples. The video encoding method also comprises generating luma residual signals by subtracting the luma prediction samples from the current block.

Another aspect of the present disclosure provides an intra prediction method for a current block, which is performed by a computing device. The intra prediction method comprises obtaining LMCS parameters and a first flag indicating whether LMCS is activated from a bitstream. The LMCS is a method for converting the luma signals between an original area and a mapping area of luma signals. The intra prediction method also comprises generating luma residual signals from the bitstream. The intra prediction method also comprises generating a luma mapping function of converting a dynamic area of the luma signals by using the LMCS parameters when the first flag is activated. The intra prediction method also comprises generating luma reference samples for the current block by using the luma mapping function when neighboring restoration samples of the current block is not available. The intra prediction method also comprises generating luma prediction samples by performing intra prediction for the current block based on the luma reference samples.

As described above, the present embodiment provides a video encoding/decoding method of performing intra prediction for a current block by using luma reference samples derived based on a luma mapping function for a case where restored samples around a current block to be predicted cannot be used. Thus, performance of intra prediction may be enhanced.

Further, in signaling parameters for LMCS related to the luma mapping function for one picture or slice, the present disclosure provides a video encoding/decoding method of signaling a form of corresponding parameters and an identifier for the form. Thus, a list of a parameter set based on the form and the identifier may be managed.

DETAILED DESCRIPTION

Figure 1:
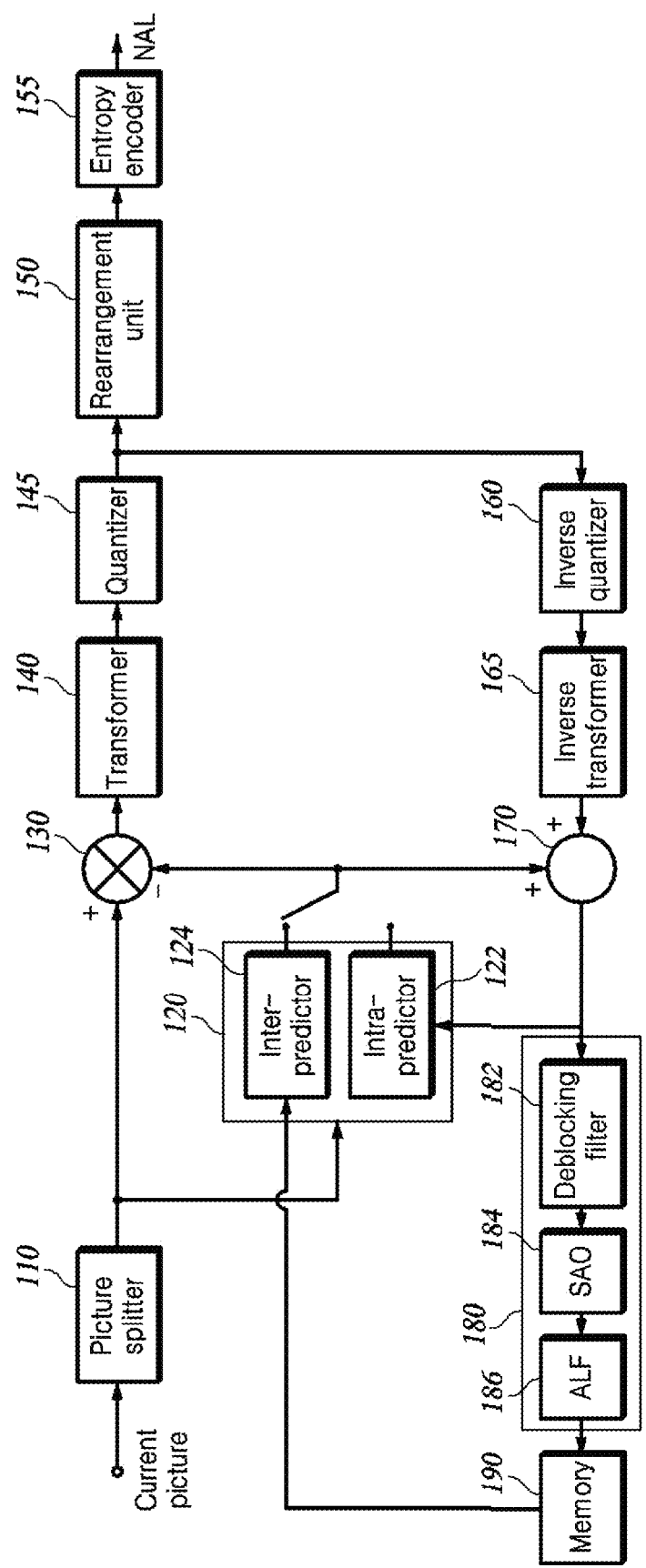
FIG. 1 is a block diagram for a video encoding apparatus, which may implement technologies of the present disclosure.

Hereinafter, embodiments of the present disclosure are described in detail with reference to drawings. When reference numerals refer to components of each drawing, it should be noted that although the same or equivalent components are illustrated in different drawings, the same or equivalent components may be denoted by the same reference numerals. Further, in describing the embodiments, a detailed description of known related configurations and functions may be omitted to avoid unnecessarily obscuring the subject matter of the embodiments.

FIG. 1 is a block diagram for a video encoding apparatus, which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop-filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VP S). Further, information commonly applied to one tile or tile group may also be encoded as the syntax of a tile or tile group header. The syntaxes included in the SPS, the PPS, the slice header, the tile, or the tile group header may be referred to as a high-level syntax.

The picture splitter 110 determines a size of a CTU. Information (CTU size) on the size of the CTU is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may be a binary tree (BT) in which the higher node is split into two lower nodes. The tree structure may be a ternary tree (TT) in which the higher node is split into three lower nodes at a ratio of 1:2:1. The tree structure may be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a BTTT is added to the tree structures to be referred to as a multiple-type tree (MTT).

Figure 2:
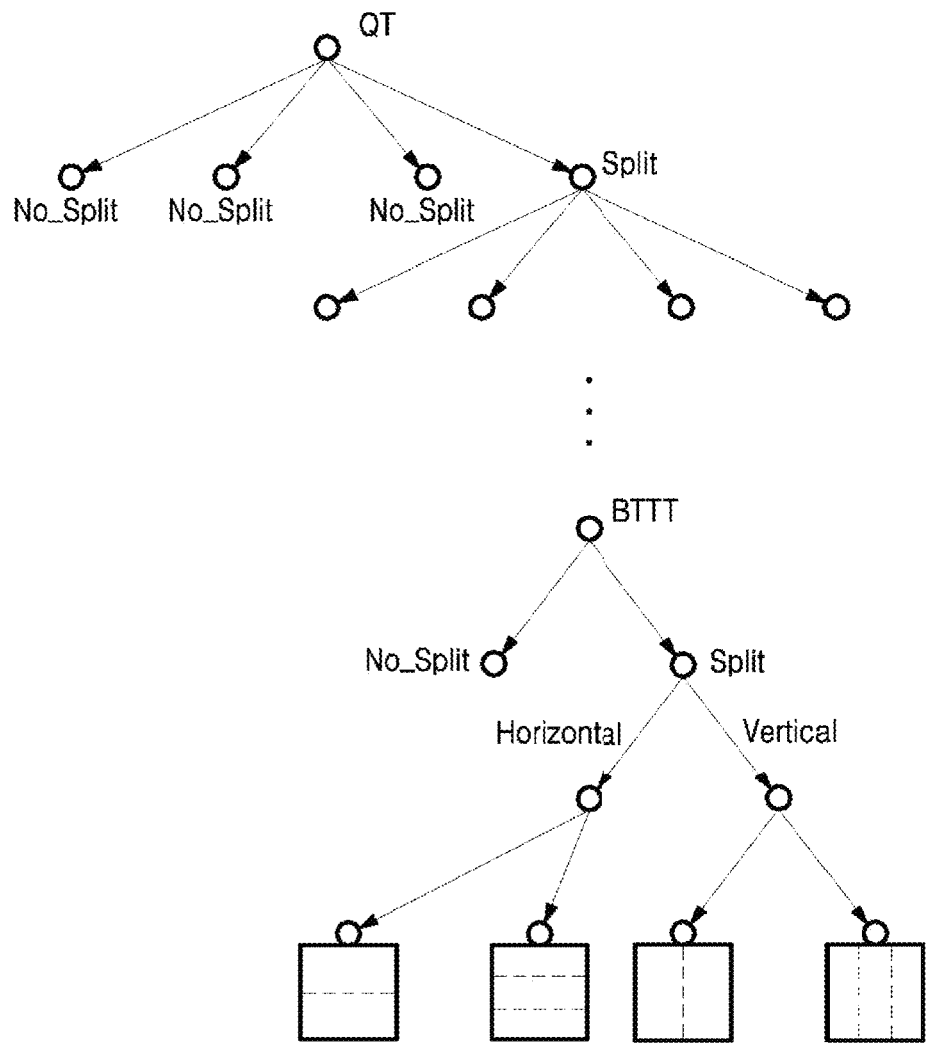
FIG. 2 is a diagram for describing a method for splitting a block by using a quadtree plus binary tree ternary tree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) whether the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). Inter prediction includes both unidirectional prediction and bidirectional prediction.

Figure 3A:
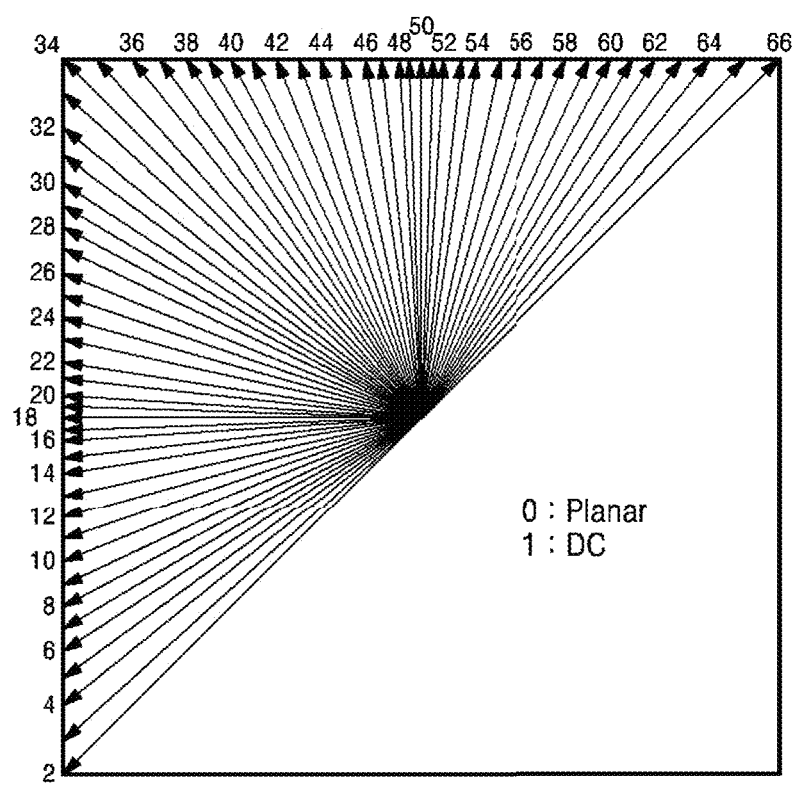
FIGS. 3A and 3B are diagrams illustrating a plurality of intra prediction modes including wide angle intra prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
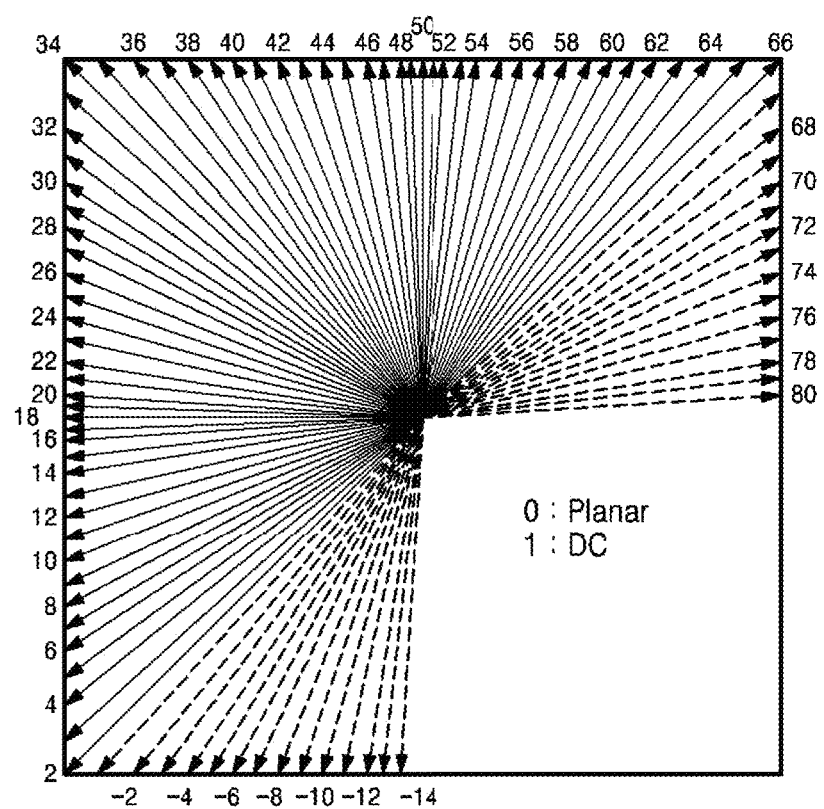

For efficient directional prediction for the current block having the rectangular shape, directional modes (#67 to #80, intra prediction modes #−1 to #−14) illustrated as dotted arrows in FIG. 3B may be additionally used. The direction modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel)

and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component and a motion vector calculated based on the luma component is used for both luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a differential motion vector to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
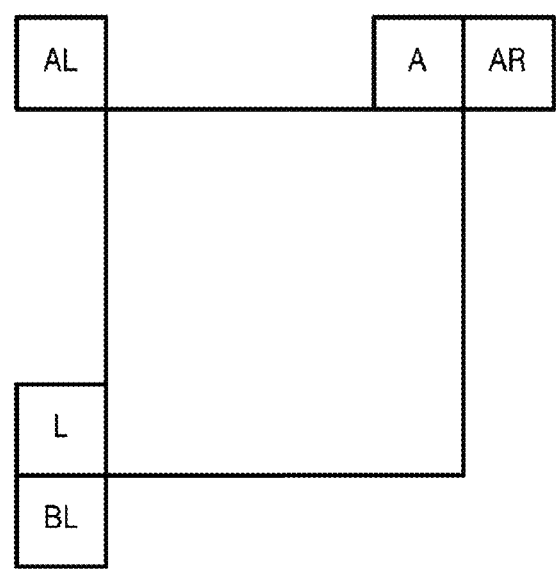
FIG. 4 is a diagram for neighboring blocks of a current block.

As a neighboring block for deriving the merge candidate, all or some of a left block L, a top block A, a top right block AR, a bottom left block BL, and a top left block AL adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

Another method for encoding the motion information is an advanced motion vector prediction (AMVP) mode.

In the AMVP mode, the inter predictor 124 derives prediction motion vector candidates for the motion vector of the current block by using the neighboring blocks of the current block. As a neighboring block used for deriving the prediction motion vector candidates, all or some of a left block L, a top block A, a top right block AR, a bottom left block BL, and a top left block AL adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the prediction motion vector candidates. For example, a co-located block with the current block within the reference picture or blocks adjacent to the co-located block may be used.

The inter predictor 124 derives the prediction motion vector candidates by using the motion vector of the neighboring blocks and determines the prediction motion vector for the motion vector of the current block by using the prediction motion vector candidates. In addition, a differential motion vector is calculated by subtracting the prediction motion vector from the motion vector of the current block.

The prediction motion vector may be acquired by applying a pre-defined function (e.g., center value and average value computation, etc.) to the prediction motion vector candidates. In this case, the video decoding apparatus also knows the pre-defined function. Further, since the neighboring block used for deriving the prediction motion vector candidate is a block in which encoding and decoding are already completed, the video decoding apparatus may also already know the motion vector of the neighboring block. Therefore, the video encoding apparatus does not need to encode information for identifying the prediction motion vector candidate. Accordingly, in this case, information on the differential motion vector and information on the reference picture used for predicting the current block are encoded.

Meanwhile, the prediction motion vector may also be determined by a scheme of selecting any one of the prediction motion vector candidates. In this case, information for identifying the selected prediction motion vector candidate is additional encoded jointly with the information on the differential motion vector and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the differential motion vector) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block-based prediction and transform/quantization. The filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
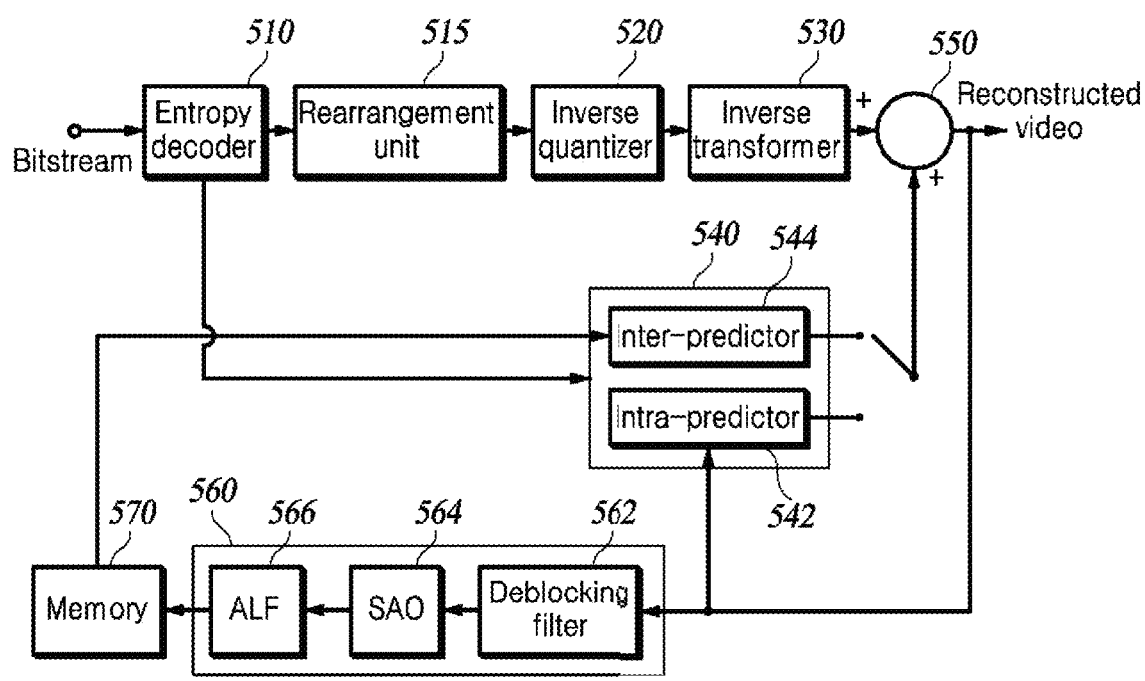
FIG. 5 is a block diagram for a video decoding apparatus, which may implement the technologies of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split_flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transform unit and the prediction block output from the inter prediction unit or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present embodiment relates to image (video) encoding and decoding as described above. More particularly, the embodiment provides a video encoding/decoding method of performing intra prediction for a current block by using luma reference samples derived based on a luma mapping function in order to enhance performance of intra prediction for a case where restored samples around the current block to be predicted cannot be used.

Further, in signaling a parameter for luma mapping chroma scaling (LMCS) related to the luma mapping function for one picture or slice, the embodiment provides a video encoding/decoding method of managing a list of a parameter set based on a form and an identifier by signaling the form of corresponding parameters and the identifier for the form.

In the following description, the video encoding apparatus and method are used in parallel with the encoding apparatus and method, and the video decoding apparatus and method are used in parallel with the decoding apparatus and method.

The luma mapping function reflects cognitive perceptual characteristics of humans by converting luma signals of a picture into another mapping area to increase a contrast for luma areas that humans cannot distinguish well, while decreasing the contrast for luma areas that humans distinguish well. By controlling the contrast for luma areas, there is an effect of enhancing the performance of the intra prediction, and there is an advantage in that errors perceived by humans are reduced even though quantization error occurs. In other words, by applying the luma mapping function, it may be possible to enhance coding performance of the intra prediction and to enhance subjective image quality.

The LMCS performs conversion between an original dynamic area (hereinafter, referred to as 'original area') and another dynamic area (hereinafter, referred to as 'mapping area') of the picture based on the luma mapping function. Further, the LMCS reflects the influence of the luma mapping to a scaling of chroma residual signals.

Figure 6:
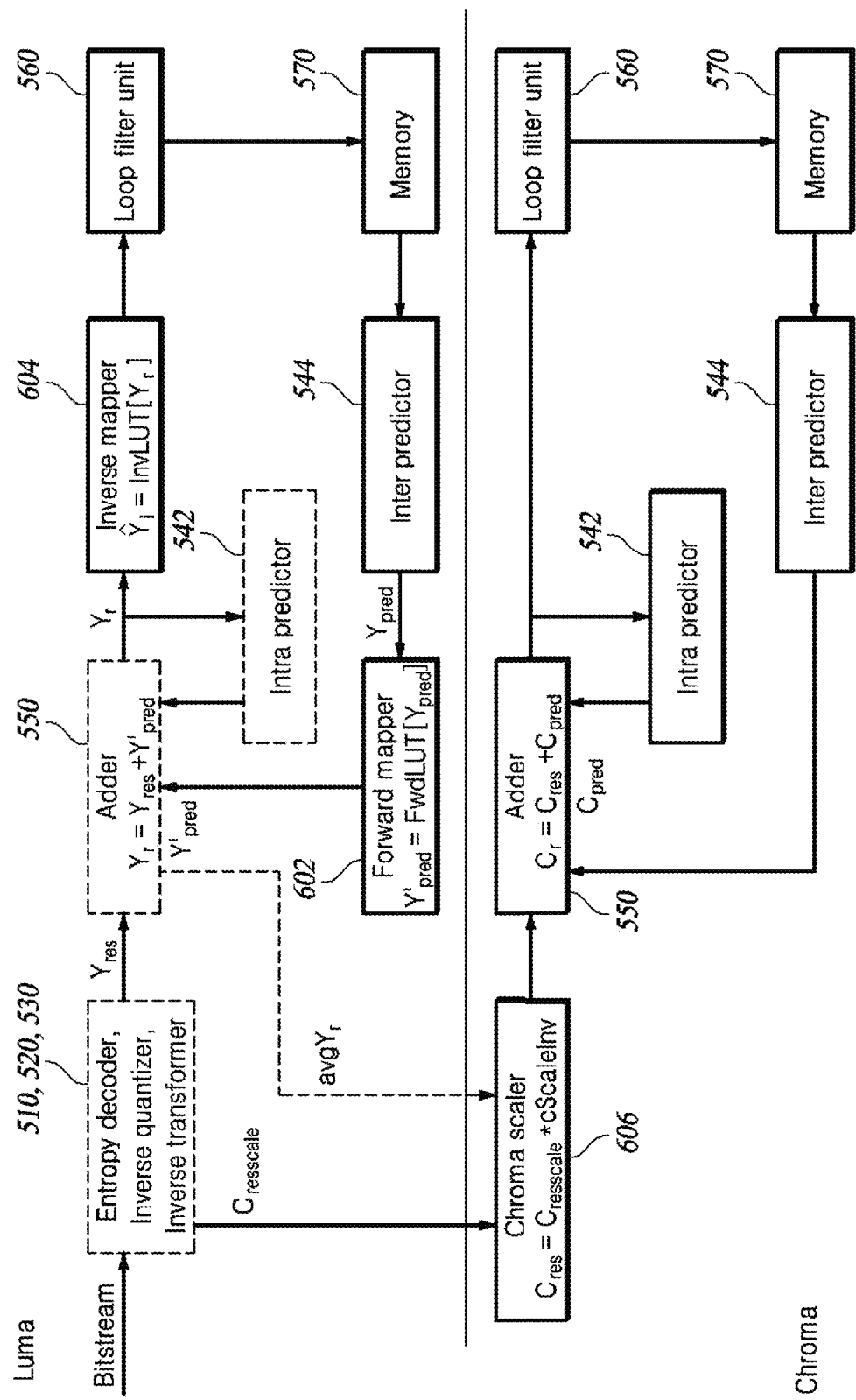
FIG. 6 is a block diagram for a video decoding apparatus to which luma mapping chroma scaling (LMCS) is applied according to an embodiment of the present disclosure.

FIG. 6 is a block diagram for a video decoding apparatus to which LMCS is applied according to an embodiment of the present disclosure.

The decoding apparatus may apply the LMCS based on the luma mapping function in order to enhance a coding rate and the subjective image quality. In order to perform the LMCS, the decoding apparatus may additionally include all or some of a forward mapper 602, an inverse mapper 604, and a chroma scaler 606 in addition to the existing components.

Among the existing components illustrated in FIG. 6, blocks indicated by dotted lines operate in the mapping area, which is the dynamic area to which the luma mapping is applied, and blocks indicated by solid lines operate in the original area, which is the dynamic area before the luma mapping is applied. As compared with the intra prediction being performed in the mapping area, the inter prediction is performed in the original area. Since there is a picture where the intra prediction and the inter prediction may be simultaneously performed, the conversion between the mapping area and the original area should be performed.

The forward mapper 602 converts inter predicted luma signals Ypred from the original area to the mapping area by applying a forward luma mapping function to generate mapped luma signals Y'pred. The adder 550 adds the mapped luma signals and luma residual signals Yres to generate restoration signals Yr in the mapping area. The intra prediction may be performed in the mapping area based on the restoration signals Yr.

The inverse mapper 604 inversely converts the restoration signals Yr from the mapping area to the original area by applying an inverse luma mapping function to generate the restoration signals in the original area. The restoration signals in the original area may be loop-filtered, then may be stored in the memory and may be used for the inter prediction afterwards.

Meanwhile, in order to activate LMCS application, the encoding apparatus may signal a flag for activating the LMCS to the decoding apparatus.

Figure 7A:
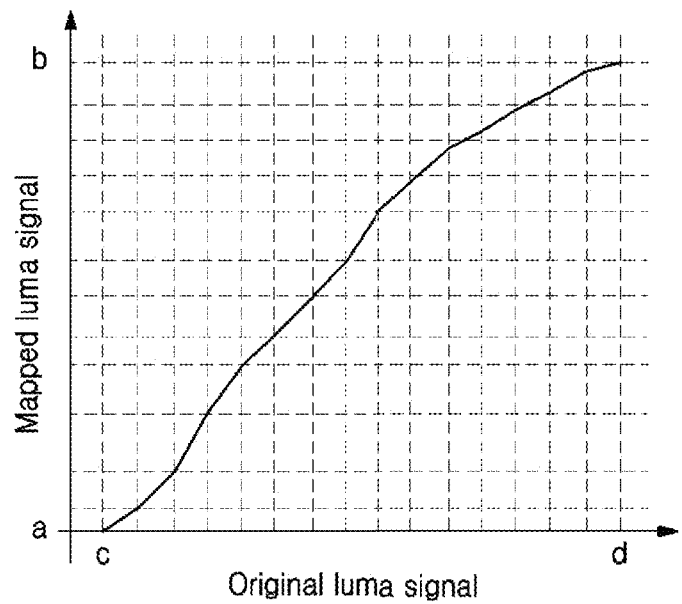
FIGS. 7A and 7B are diagrams for a forward luma mapping function and an inverse luma mapping function according to an embodiment of the present disclosure.
Figure 7B:
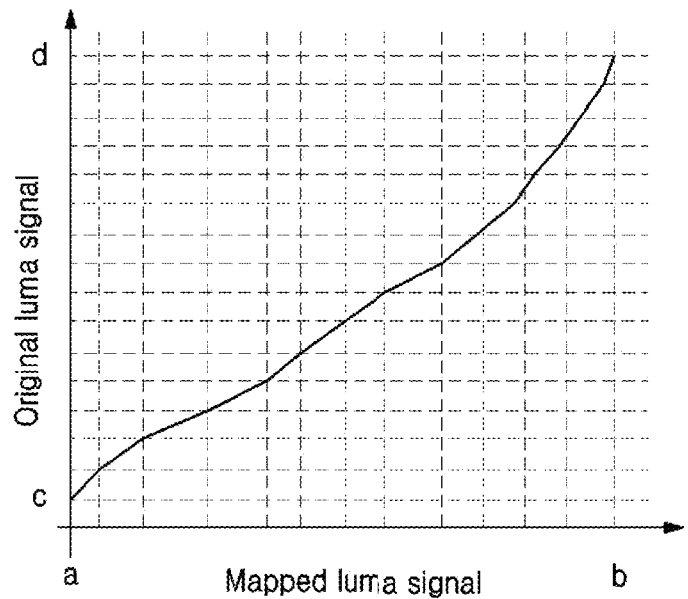

FIGS. 7A and 7B are diagrams for a forward luma mapping function and an inverse luma mapping function according to an embodiment of the present disclosure.

The luma mapping function and the mapped luma signals may be generated by inferring the cognitive perceptual characteristics of humans based on local/global characteristics of the original image. As illustrated in FIGS. 7A and 7B, as the forward luma mapping function or the inverse luma mapping function, a piecewise linear model may be used.

For example, in the examples of FIGS. 7A and 7B, each of the forward luma mapping function and the inverse luma mapping function is implemented as the piecewise linear model segmented into 16 sections. The piecewise linear model may be implemented as a predetermined look-up table but is not particularly limited thereto. The piecewise linear model may also be implemented by using computational equations. For example, in the example of FIG. 6, FwdLuT included in the forward mapper 602 is a look-up table for the forward luma mapping function, and InvLuT included in the inverse mapper 604 is a look-up table for the inverse luma mapping function.

Meanwhile, the chroma signals are processed in the original area, but the influence of the luma mapping applied to the luma signals needs to be considered.

The chroma scaler 606 performs chroma residual scaling. In other words, scaled chroma residual signals Cresscale are multiplied by a scaling value cScaleInv to generate chroma residual signals Cres. Here, the scaling value may be generated from a predetermined look-up table based on an index extracted by applying the inverse luma mapping to an average value of the restoration signals Yr to which the inverse luma mapping is applied. The average value of the luma restoration signals Yr may be generated by averaging luma reference samples located at the left or the top of a virtual pipeline data unit (VPDU) block including a block to which chroma scaling is applied.

Meanwhile, in order to activate the chroma residual scaling, the encoding apparatus may signal a flag for activating the chroma residual scaling to the decoding apparatus.

When the chroma residual scaling is supported, the encoding apparatus may divide the chroma residual signals by the scaling value cScaleInv, generate the scaled chroma residual signals Cresscale, and then transfer the generated chroma residual signals to the decoding apparatus.

Meanwhile, LMCS parameters related to the luma mapping function and the look-up table for the chroma scaling as a part of an adaptation parameter set (APS) may be transferred from the encoding apparatus to the decoding apparatus.

Table 1 shows a syntax table of the APS according to an embodiment of the present disclosure.

TABLE 1

|  | Descriptor |
| --- | --- |
| adaptation_parameter_set_rbsp( ) { |  |
|   aps_adaptation_parameter_set_id | u(5) |
|   aps_params_type | u(3) |
|   aps_chroma_present_flag | u(1) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   ... |  |
| } |  |

The APS is a separate parameter set defined for various parameters applied to one or multiple pictures or one or multiple slices. The APS is not signaled by the unit of the picture or slice, and an APS identifier (ID) to be used in the corresponding picture or slice is signaled in a picture or slice header.

As parameters applied to one or multiple pictures and one or multiple slices, there are filter parameters for ALFs 186 and 566, LMCS parameters, scaling list parameters, etc. Additionally, weighted prediction-related parameters, block structure-related parameters, picture partition-related parameters, etc. as adaptive parameters, which may be applied for each picture or slice, may be transmitted based on the APS.

In an APS syntax table shown in Table 1, aps_adaptation_parameter_set_id may be signaled as the APS ID. The APS ID represents a unique number assigned to each APS, which is set as a premise that a plurality of APSs is transmitted in one video stream. The APS ID may be expressed as a specific positive integer.

In the APS syntax table shown in Table 1, aps_params_type may be signaled as the APS type. The APS type may be information indicating at least one of the ALFs 186 and 566, the LMCS, or the scaling list described above, and the information may be expressed as a specific positive integer. In another embodiment of the present disclosure, the APS type may indicate the weighted prediction, the block structure, the picture partition, etc. in addition to the ALF, the LMCS, or the scaling list.

Meanwhile, the APSs in which the APS types are different may be permitted to have the same ID. A meaning that each APS type is permitted to have the same APS ID indicates that the APS ID may be independently used according to the APS type. Therefore, a different APS list may be configured according to the APS type.

In the APS syntax table shown in Table 1, parameters transmitted by using the APS may be different according to the APS type. Further, the parameters may be decoded based on a different decoding process according to the APS type. For example, when the APS type is ALF_APS, the decoding apparatus may obtain ALF-related information by performing alf_data( ), which is a process of decoding the parameters for the ALF. When the APS type is LMCS_APS, LMCS-related information may be obtained by performing lmcs_data( ), which is a process of decoding the LMCS parameters. Further, when the APS type is SCALING_APS, scaling list-related information may be obtained by performing scaling_list_data( ), which is a process of decoding the scaling list parameters.

Meanwhile, in Table 1, aps_chroma_present_flag is a flag indicating that an APS related to the chroma signal is present. The APS related to the chroma signal may be signaled for each APS type. For example, when aps_chroma_present_flag is activated, the parameter related to the chroma scaling may be obtained in lmcs_data( ), which is a process of decoding the LMCS-related parameters.

Table 2 shows lmcs_data( ), which is the process of decoding the LMCS-related parameters. The parameters shown in Table 2 may be used for implementing the piecewise linear model by the look-up table or the computational equations.

TABLE 2

|  | Descriptor |
| --- | --- |
| lmcs_data( ) { |  |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx: i <= 15 − lmcs_delta_max_bin_idx: i++ ) { |  |
|     lmcs_delta_abs_cw[ i ] | u(v) |
|     if( lmcs_delta_abs_cw[ i ] > 0 ) |  |
|       lmcs_delta_sign_cw_flag[ i ] | u(1) |
|   } |  |
|   if( aps_chroma_present_flag ) { |  |
|     lmcs_delta_abs_crs | u(3) |
|     if( lmcs_delta_abs_crs > 0 ) |  |
|       lmcs_delta_sign_crs_flag | u(1) |
|   } |  |
| } |  |

Here, lmcs_min_bin_idx represents a minimum index among indexes indicating sections of the piecewise linear model. Further, lmcs_delta_max_bin_idx as a difference from a maximum available index (e.g., 15 in Table 2) indicting a section of the piecewise linear model, and (15−lmcs_delta_max_bin_idx) represents a maximum index among indexes indicating the sections of the piecewise linear model.

Further, lmcs_delta_sign_cw and lmcs_delta_sign_cw_flag represent parameters signaled to generate pivot values used for implementation when the piecewise linear model is implemented. Also, lmcs_delta_cw_prec_minus1 represents a parameter for signaling a bit number of lmcs_delta_sign_cw.

Meanwhile, lmcs_delta_abs_crs and lmcs_sign_crs_flag are parameters signaled for implementing the look-up table storing the scaling value used in the scaling process.

In the embodiment according to the present disclosure, when the LMCS is activated, for example, as the APS ID for LMCS applied to the picture corresponding to the current slice or the current picture, ph_lmcs_aps_id may be signaled from the encoding apparatus to the decoding apparatus. In this case, ph_lmcs_aps_id means the APS ID for the LMCS obtained in the picture header, but a method of obtaining the APS ID is not particularly limited thereto. In other words, the APS ID for the LMCS may be signaled by using the picture header, the slice header, the PPS, or the SPS.

When one or more pieces of information on the APS ID are signaled in a plurality of parameter sets (PPS or SPS) or header (picture header or slice header), an additional step for finding the APD ID applied to a current decoding process may be initiated. For example, in additional step, information signaled in a detailed step may be preferentially selected in the order of the slice header, the picture header, the PPS, and the SPS, or in the reverse order information signaled in a higher step may be preferentially selected. Further, it is predefined that information on a specific parameter set or header is prioritized to implement the additional step.

Hereinafter, a method of performing the intra prediction by applying the luma mapping function to the current block, which may not use neighboring luma restoration samples, is described.

As illustrated in FIGS. 7A and 7B, in the process of generating the mapped luma signals by using the forward luma mapping function, a minimum value a and a maximum value b may be derived. Further, a minimum value c and a maximum value d of the original area may be derived by using the inverse luma mapping function. In this case, a may be always 0 for coding efficiency and b may vary according to video characteristics and a bitdepth. For example, for a video in which the bitdepth is 10 bits, b may be a smaller value than 1023, which is a maximum generation value. Meanwhile, c and d may vary according to maximum/minimum brightness values of an original video, and two values may also be derived based on the forward luma mapping function and the inverse luma mapping function. In the case of an area or a picture in which the luma mapping function is not used, the maximum value and the minimum value may be derived based on the bitdepth according to a current sequence, picture, color space, etc. For example, luma signals of the 10-bit video may have brightness values ranging from 0 to 1023, and the minimum value is 0 and the maximum value is 1023.

Figure 8:
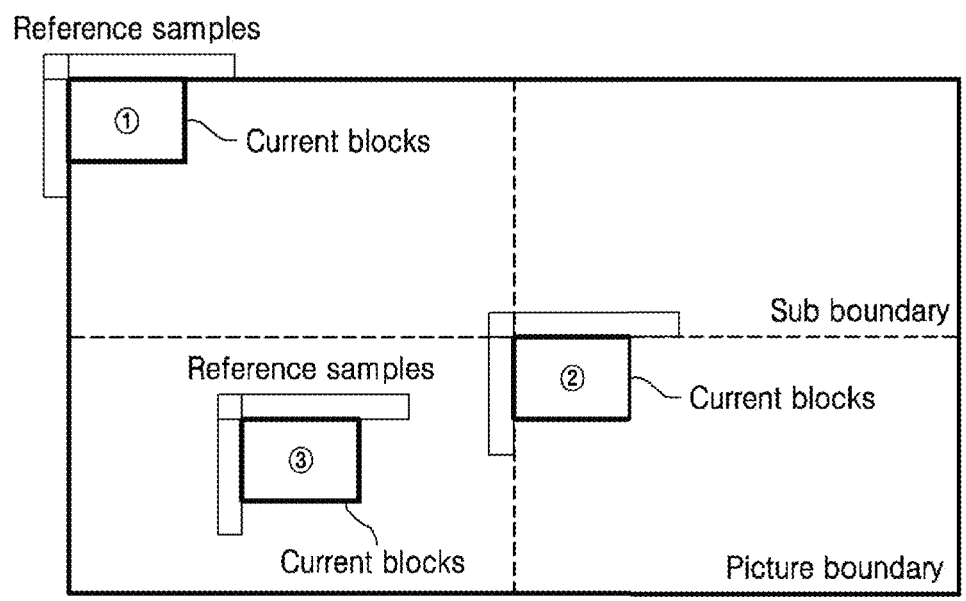
FIG. 8 is a diagram for locations of reference samples used for intra prediction according to an embodiment of the present disclosure.

FIG. 8 is a diagram for locations of reference samples used for intra prediction according to an embodiment of the present disclosure.

Pre-restored neighboring samples should be requisitely used as the reference samples in order to perform the intra prediction for the current block. However, in the case illustrated in FIG. 8, neighboring samples of the current block may not be used as the reference samples. A top-left block (block ①) of a start block of the current picture is a restored block in the current picture and does not have the pre-restored neighboring samples. Alternatively, on a specific boundary expressed as a sub boundary, even though the pre-restored samples are present, the re-restored samples are not used as the reference samples. The sub boundary indicates a boundary including the slice and a tile boundary. In other words, in the case of a first block of the tile or a first block of the slice (block ②), the pre-stored neighboring samples may not be used as the reference samples. Further, even in a slice started by gradual decoding refresh (GDR), which is a random access method that does not use slice I, there is no available neighboring samples. Further, in the case of a block of forcibly performing the intra prediction in slice P or B (corresponding to constraint intra mode, block ③), the intra prediction is forcibly performed in order to maintain error robustness, and the decoding apparatus performs the intra prediction without using the neighboring restored samples.

When the neighboring reference samples of the current block cannot be used as such, a predetermined value may be used as a value of the reference samples according to a prior agreement between the encoding apparatus and the decoding apparatus. For example, a median value according to the current bitdepth may be used. When the current bitdepth is 10 bits, 512, which is the median value of 0 to 1023, may be used as a value of the reference samples. Equation 1 shows a process of calculating the value of the reference samples DCValue according to the bitdepth.

$$DCValue=1<<(Bitdepth-1) \qquad \text{[Equation 1]}$$

Alternatively, the value of reference samples may be calculated by using the luma mapping function illustrated in FIGS. 7A and 7B. In other words, when the luma mapping is applied to the current area, the maximum value a and the minimum value b may be derived from the forward luma mapping function, and the resulting median value may be calculated. If reference samples, which may not be used currently, are present in the mapping area, a median value (b+a+1)/2 may be calculated and used as the value of the reference samples as shown in Equation 2.

$$DCValue=(b+a+1)>>1 \qquad \text{[Equation 2]}$$

Meanwhile, the minimum value a of the forward luma mapping function may also be always 0. Therefore, as shown in Equation 3, the median value (b+1)/2 may be calculated and used as the value of the reference samples.

$$DCValue=(b+1)>>1 \qquad \text{[Equation 3]}$$

When the look-up table FwdLUT is used as the forward luma mapping function, the median value may be derived from the look-up table immediately without the calculation as shown in Equation 4.

$$DCValue=FwdLUT[1<<(Bitdepth-1)] \qquad \text{[Equation 4]}$$

Alternatively, when the area is not mapped, but the luma mapping function may be used, the median value (d+c+1)/2 may be calculated based on the minimum value c and the maximum value d of the original luma signal and used as the reference sample value.

$$DCValue=(d+c+1)>>1 \qquad \text{[Equation 5]}$$

Figure 9:
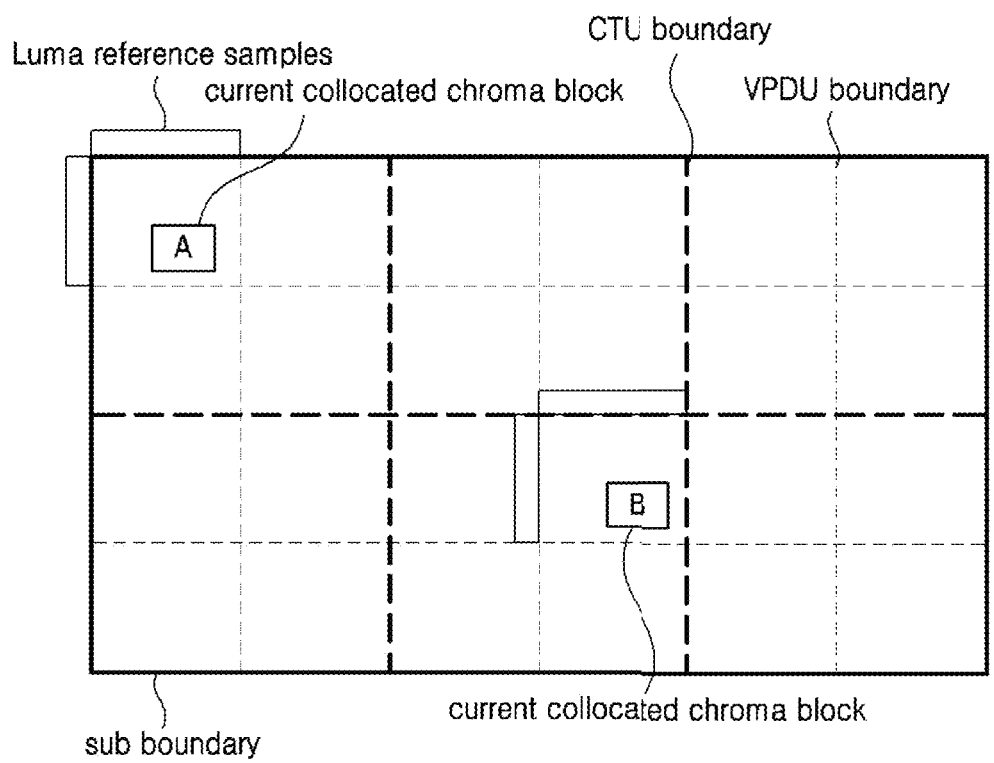
FIG. 9 is a diagram illustrating locations of luma reference samples used for chroma residual scaling according to an embodiment of the present disclosure.

FIG. 9 is a diagram illustrating locations of luma reference samples used for chroma residual scaling according to an embodiment of the present disclosure.

First, as illustrated in FIG. 6, for the area to which the luma mapping function is applied, the decoding apparatus may perform scaling for the scaled chroma residual signals transmitted from the encoding apparatus. As described above, the encoding apparatus may generate the scaling value according to a feature of the video and then transmit the scaling value to the video decoding apparatus. The decoding apparatus may store the transmitted scaling value in the look-up table based on an average luma value of a neighboring virtual pipeline data unit (VPDU). Here, the VPDU is an area in which the picture is partitioned not to be overlapped, and the decoding apparatus should be designed to simultaneously process consecutive VPDUs including a plurality of pipeline steps.

Meanwhile, luma reference samples illustrated in FIG. 9 are reference samples for calculating the average luma value for chroma blocks A and B. In other words, in an area for luma signals, the average luma value of left and top reference sample lines of the VPDU, which is a higher data unit corresponding to a location where the chroma block is present, may be used. Since block B is positioned inside the picture, the slice, and the tile, one or more reference samples may be used. However, since block A is the first VPDU of one of the picture, the slice, and the tile, the neighboring reference samples for the luma signals may not be present or may not be used.

In this case, a predetermined value may be used as the value of reference samples according to a prior agreement between the encoding apparatus and the decoding apparatus. For example, as shown in Equation 1, the median value according to the bitdepth of the current luma signals may be used as the value of the reference samples.

Alternatively, if reference samples, which may not be used currently, are present in the mapping area, a central value $(b+a+1)/2$ may be calculated and used as the value of the reference samples based on the minimum value a and the maximum value b of the forward luma mapping function as shown in Equation 2. Meanwhile, the minimum value a of the forward luma mapping function may also be always 0. Therefore, the median value $(b+1)/2$ may be calculated and used as the value of the reference samples.

When the look-up table is used as the forward luma mapping function, the median value may be derived from the look-up table immediately without the calculation as shown in Equation 4. Alternatively, when the area is not mapped, but the luma mapping function may be used, the median value $(d+c+1)/2$ may be calculated based on the minimum value c and the maximum value d of the original luma signal and used as the value of the reference samples.

Hereinafter, a method of performing matrix-based intra prediction (MIP) by using the luma mapping function is described.

Figure 10:
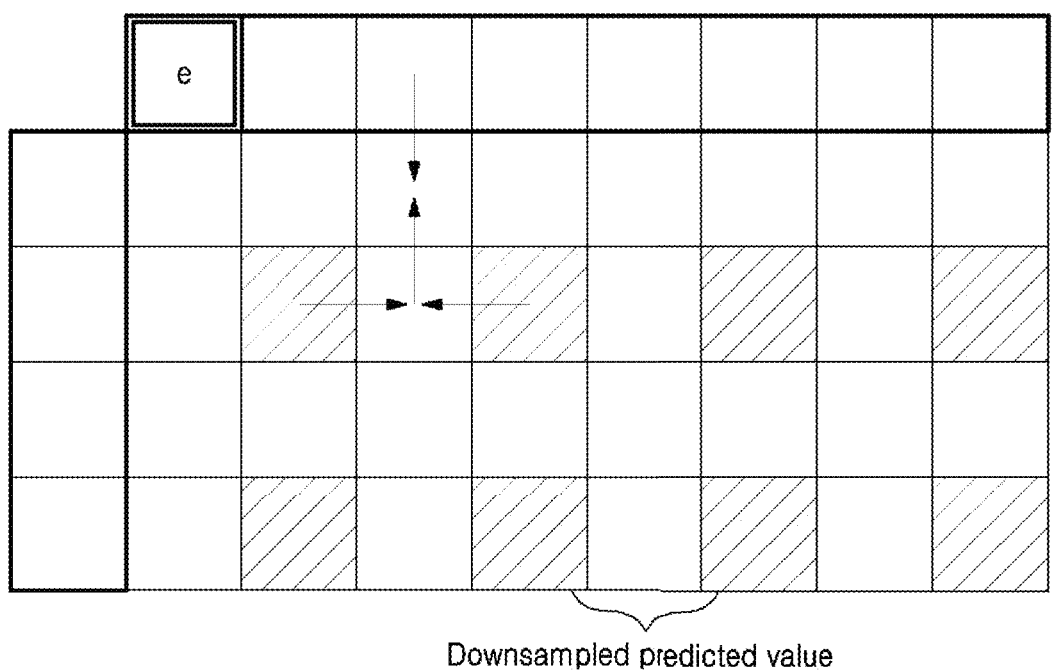
FIG. 10 is a diagram illustrating reference samples used for a matrix-based intra prediction (MIP) mode according to an embodiment of the present disclosure.

FIG. 10 is a diagram illustrating reference samples used for an MIP mode according to an embodiment of the present disclosure.

The MIP mode is a method of performing the intra prediction by using a matrix operation. In order to active the MIP mode, the encoding apparatus may signal a flag for activating the MIP mode to the decoding apparatus.

In the prediction of the MIP mode, the neighboring reference samples are sampled, the sampled reference samples are multiplied by an MW matrix, and an offset is added to generate downsampled predicted samples. A process of upsampling the predicted samples is performed to coincide the size of upsampled samples with a size of original block. In this case, one of the reference samples is regarded as the offset. The offset is subtracted from the brightness values of the reference samples multiplied by the MIP matrix and then multiplied by the MIP matrix. In other words, this process is the same as performing a process of regarding one of the reference samples as the average value of the reference samples and normalizing the reference samples by using the average value. For example, in the example of FIG. 10, a location of sample e may be a location of offset.

Meanwhile, since the MIP matrix uses values, which do not have a sign, sample e is changed based on the median value according to the bitdepth of the current luma signals to generate a value of the reference sample aValue.

$$a\text{Value}=(1<<(\text{Bitdepth}-1)-e \quad \text{[Equation 6]}$$

Alternatively, if the reference sample e is present in the mapping area, the reference sample e may have a different distribution from the reference samples used when generating the MIP matrix. Therefore, the offset may be calculated based on the luma mapping function. Since the intra prediction is performed in the mapping area, the value of reference sample may be generated by changing the sample e as shown in Equation 7 based on $(b+a+1)/2$ which is the median value between the maximum value a and the minimum value b of the forward luma mapping function illustrated in FIG. 7A.

$$a\text{Value}=((b+a+1)>>1)-e \quad \text{[Equation 7]}$$

Meanwhile, since the minimum value a of the forward luma mapping function may also be always 0, the value of reference sample may be generated by changing the sample e based on the median value $(b+1)/2$ as shown in Equation 8.

$$a\text{Value}=((b+1)>>1)-e \quad \text{[Equation 8]}$$

When the look-up table is used as the forward luma mapping function, the value of reference sample may be generated by changing the sample e based on the median value of the look-up table as shown in Equation 9.

$$a\text{Value}=\text{FwdLUT}[1<(\text{Bitdepth}-1)]-e \quad \text{[Equation 9]}$$

As described above, according to the embodiment, the video encoding/decoding method of converting the offset used in the MIP mode based on the luma mapping function is provided to enhance the performance of the intra prediction using the MIP mode.

Hereinafter, a method considering the luma mapping function in cross component linear model (CCLM) prediction based intra prediction is described.

CCLM prediction is an intra prediction method using a linear model indicating a similarity between the luma signals and the chroma signals. In order to activate a CCLM mode, the encoding apparatus may signal a flag for activating the CCLM mode to the decoding apparatus.

Figure 11:
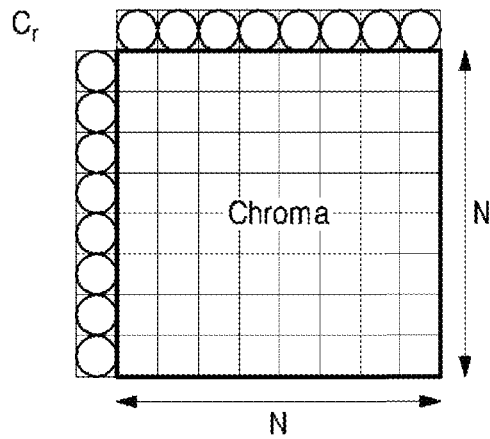
FIG. 11 is a diagram illustrating luma reference samples used for cross component linear model (CCLM) prediction according to an embodiment of the present disclosure.
Figure 11:
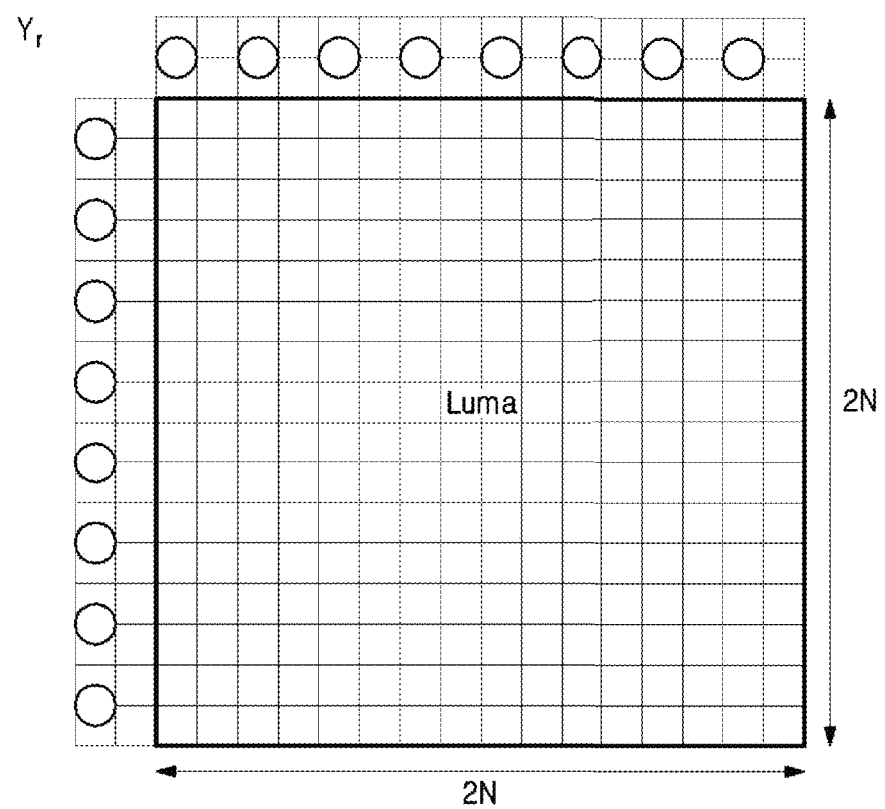

In the CCLM prediction, first, a linear conversion function is derived between neighboring reference samples and luma reference samples, which are present in the same location as the neighboring reference samples as illustrated in FIG. 11 based on a current chroma block. Here, the linear conversion function may be derived based on a minimum value of neighboring luma signals, chroma values at the same locations as the neighboring luma sample with the minimum value, a maximum value of the neighboring luma signals, and chroma values at the same locations as the neighboring luma sample with the maximum value. Next, the linear conversion function is applied to luma samples at the same location as the chroma block to perform the prediction for the chroma samples.

Figure 12A:
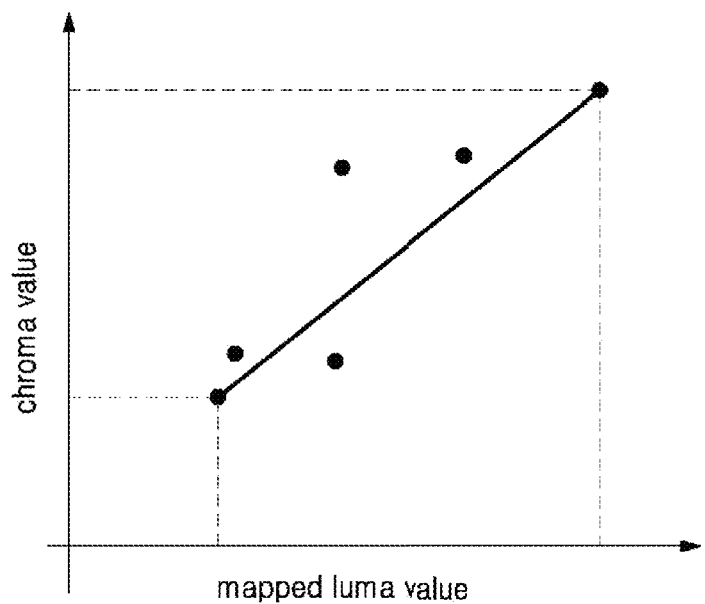
FIGS. 12A and 12B are diagrams illustrating a linear conversion function used for CCLM prediction according to an embodiment of the present disclosure.
Figure 12B:
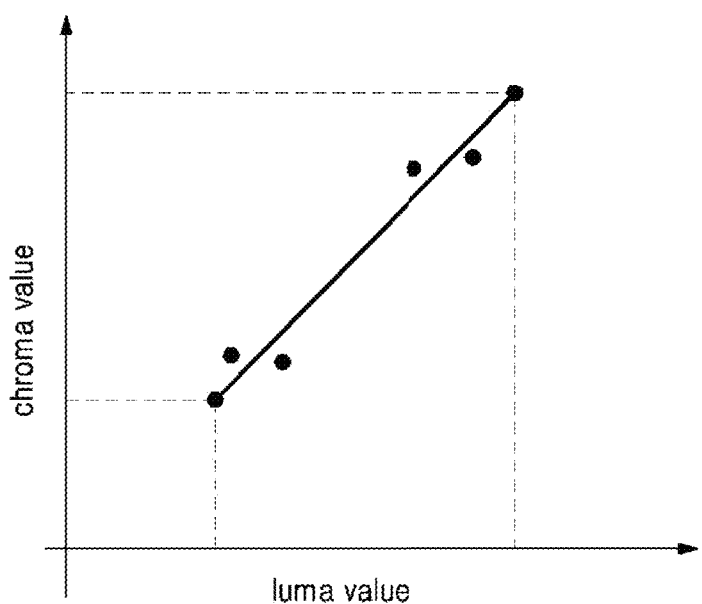

Meanwhile, when the luma mapping is applied to the luma signals, the similarity between the luma signals and the chroma signals is changed, so the prediction performance for the chroma signals may be reduced. For example, a range (see an example in FIG. 12A) of the luma signals in the mapping area may be wider than a range (see an example in FIG. 12B) of the luma signals in the original area, and in this case, chroma signal prediction may be difficult according to a contrast increase. Therefore, when the luma mapping is applied to the luma signals, a process of converting the luma signals in the mapping area into the luma signals in the original area by applying the inverse luma mapping function may be added before generating the luma reference samples for the CCLM prediction.

Figure 13:
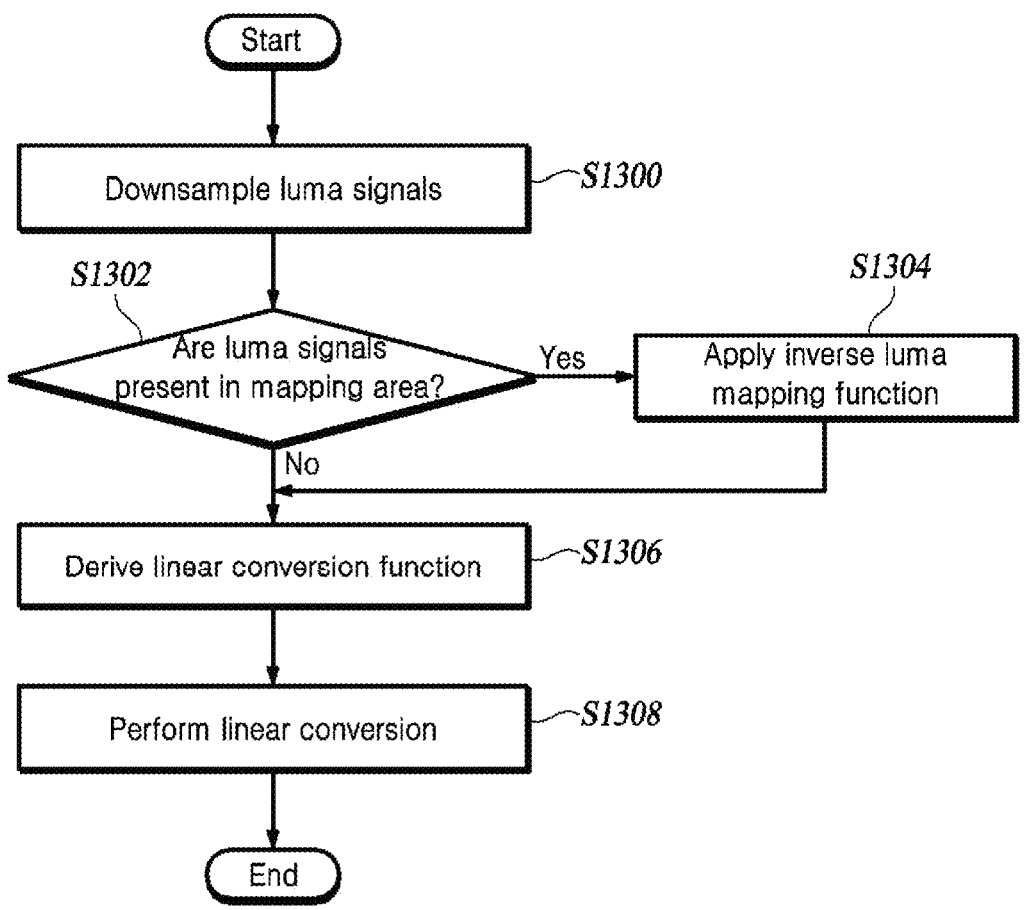
FIG. 13 is a flowchart for a CCLM prediction process by application of a luma mapping function according to an embodiment of the present disclosure.

FIG. 13 is a flowchart for a CCLM prediction process by application of a luma mapping function according to an embodiment of the present disclosure.

A decoding apparatus downsamples luma signals (S1300).

In order to use the luma signals as reference samples, the decoding apparatus downsamples neighboring luma samples so that a resolution between neighboring luma samples and luma samples at the same location as a chroma block is matched.

The decoding apparatus identifies whether the luma signals are present in a mapping area by applying a forward luma mapping function to the luma signals (S1302).

When the luma signals are present in the mapping area, the decoding apparatus inversely converts the luma signals in the mapping area into the luma signals in an original area by applying an inverse luma mapping function to the luma signals (S1304). The luma signals to which the inverse luma mapping function is applied include a luma block corresponding to the chroma block and include neighboring luma samples.

When the luma signals in the mapping area are inversely converted into the luma signals in the original area by applying the inverse luma mapping function, scaling may not be thereafter performed for chroma residual signals.

The decoding apparatus derives a linear conversion function (S1306). The decoding apparatus may derive the linear conversion function based on neighboring samples of chroma components and neighboring luma samples converted into the original area.

The decoding apparatus performs linear conversion by using the linear conversion function (S1308). The decoding apparatus may perform CCLM prediction by applying the linear conversion function to luma signals converted into the original area at the same location as the chroma block.

As described above, according to the embodiment, the video encoding/decoding method of applying the inverse luma mapping function to the luma signals before generating a luma reference samples for the CCLM prediction is provided to enhance the performance of the intra prediction for the CCLM prediction.

Hereinabove, intra prediction-related processes are described primarily based on the video decoding apparatus but are not particularly limited thereto, and most of described processes may also be applied to the video encoding apparatus.

Figure 14:
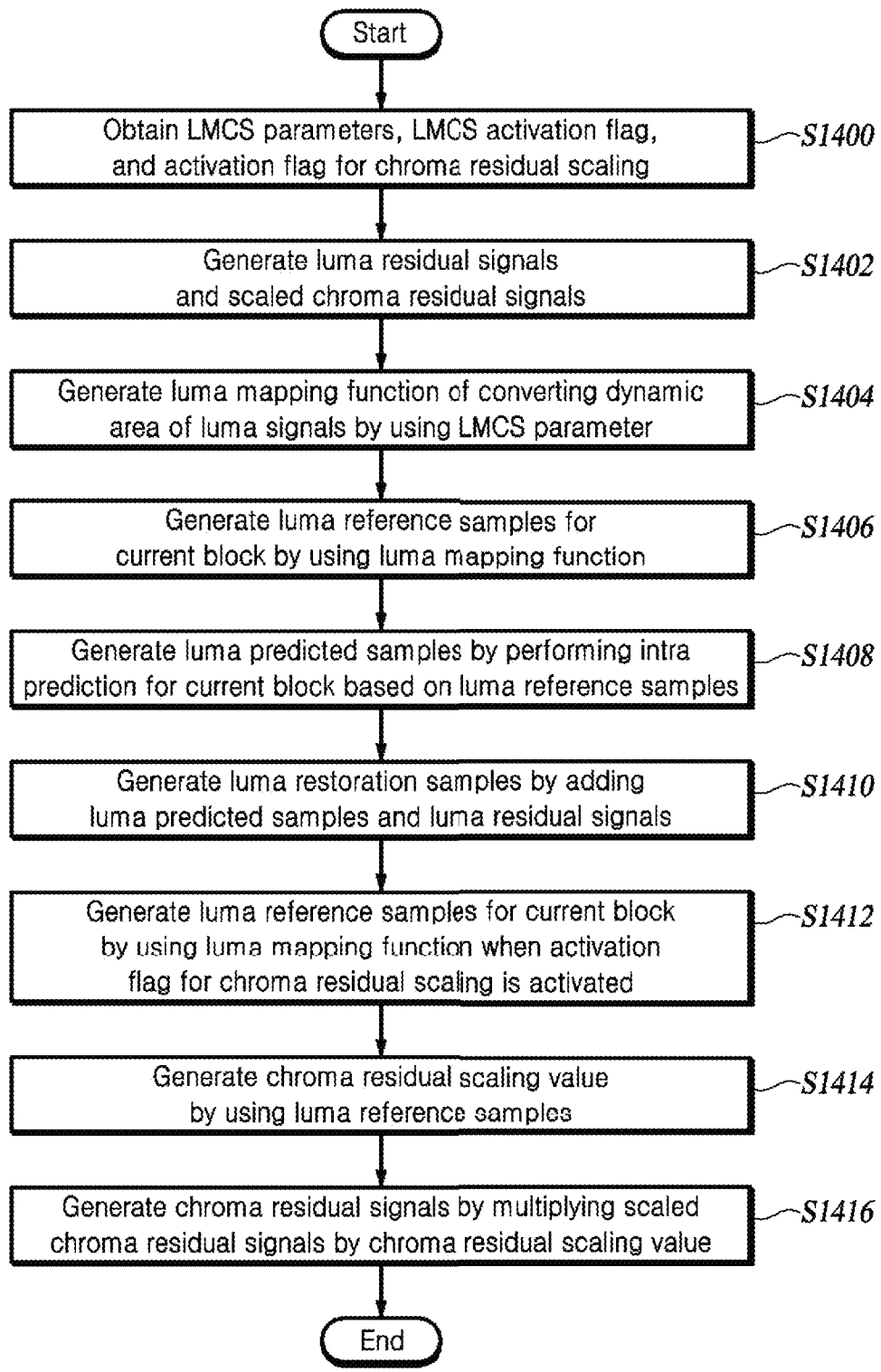
FIG. 14 is a flowchart for intra prediction by application of the luma mapping function according to an embodiment of the present disclosure.

FIG. 14 is a flowchart for intra prediction by application of the luma mapping function according to an embodiment of the present disclosure.

The decoding apparatus obtains LMCS parameters, an LMCS activation flag, and an activation flag for chroma residual scaling from a bitstream (S1400). Here, the LMCS parameters as a part of an adaptation parameter set (APS) may be transferred from the encoding apparatus to the decoding apparatus.

The decoding apparatus generates luma residual signals and scaled chroma residual signals from the bitstream (S1402).

The decoding apparatus generates a luma mapping function of converting a dynamic area of the luma signals by using the LMCS parameters when the LMCS activation flag is activated (S1404). Here, the luma mapping function indicates a forward luma mapping function of converting the luma signals into the mapping area or an inverse luma mapping function of inversely converting the mapped luma signals into the original area.

As the forward luma mapping function or the inverse luma mapping function, a piecewise linear model may be used. The piecewise linear model may be implemented as a predetermined look-up table but is not particularly limited thereto, and the piecewise linear model may also be implemented by using computational equations.

The decoding apparatus generates luma reference samples for a current block by using the luma mapping function when neighboring restoration samples of the current block may not be used (S1406). In this case, a predetermined value may be used as the value of the luma reference samples according to a prior agreement between the encoding apparatus and the decoding apparatus. For example, a median value according to the current bitdepth may be used.

A median value based on a maximum value and a minimum value generated by the forward luma mapping function may be calculated and used as the value of the luma reference samples. In this case, when the minimum value is 0, the median value based on the maximum value generated by the forward luma mapping function may be calculated and used as the value of the luma reference samples.

Meanwhile, when the look-up table is used as the forward luma mapping function, an index for the look-up table may be generated by using a bitdepth of the current block, and then a median value based on the generated index may be extracted and used as the value of the luma reference samples.

Further, when the luma signals are present in the original area, but the luma mapping function may be used, the median value based on the maximum value and the minimum value generated by the inverse luma mapping function may be calculated and used as the value of the luma reference samples.

The decoding apparatus generates luma predicted samples by performing intra prediction for the current block based on the luma reference samples (S1408).

The decoding apparatus generates luma restoration samples by adding luma predicted samples and luma residual signals (S1410).

The decoding apparatus generates the luma reference samples for the current block by using the luma mapping function when neighboring restoration samples of a VPDU, which is a higher data unit including the current block, are not available while the activation flag for the chroma residual scaling is activated (S1412).

The decoding apparatus generates a chroma residual scaling value by using the luma reference samples (S1414).

The decoding apparatus generates the chroma residual signals by multiplying the scaled chroma residual signals by the chroma residual scaling value (S1416).

In each flowchart according to the embodiment, it is described that respective processes are executed in sequence, but the present disclosure is not limited thereto. In other words, since it is applicable that the processes described in the flowchart are changed and executed or one or more processes are executed in parallel, the flowchart is not limited to a time series order.

Meanwhile, various functions or methods described in the present disclosure may also be implemented by instructions stored in a non-transitory recording medium, which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although embodiments of the present disclosure have been described for illustrative purposes, those having ordinary skill in the art should appreciate that various modifications, additions, and substitutions are possible, without departing from the idea and scope of the claims. Therefore, embodiments of the present disclosure have been described for the sake of brevity and clarity. The scope of the technical idea of the present embodiments is not limited by the illustrations. Accordingly, one of ordinary skill should understand the scope of the claims should not be limited by the above explicitly described embodiments but by the claims and equivalents thereof.

REFERENCE NUMERALS

510: entropy decoder
520: inverse quantizer
530: inverse transformer
550: adder
542: intra predictor
544: inter predictor
560: loop filter unit
570: memory
602: forward mapper
604: inverse mapper
606: chroma scaler

What is claimed is:

1. A video decoding method for performing intra prediction for a current block, which is performed by a video decoding apparatus, the method comprising:
obtaining luma mapping chroma scaling (LMCS) parameters, a first flag indicating whether LMCS is activated, and a second flag indicating whether chroma residual scaling is activated, from a bitstream, wherein the LMCS converts the luma signals between an original area and a mapping area of a luma signal;
generating luma residual signals and scaled chroma residual signals from the bitstream;
generating a luma mapping function of converting a dynamic area of the luma signals by using the LMCS parameters when the first flag is activated, wherein the luma mapping function indicates a first function of converting the luma signals into the mapping area or a second function of inversely converting the mapped luma signals into the original area;
generating luma reference samples for the current block by using the luma mapping function when neighboring restoration samples of the current block are not available;
generating luma predicted samples by performing intra prediction for the current block based on the luma reference samples; and
generating luma restoration samples by adding the luma predicted samples and the luma residual signals.

2. The method of claim 1, wherein the generating of the luma reference samples comprises calculating a median value based on a maximum value and a minimum value generated by the first function and comprising using the median value as a value of the luma reference samples.

3. The method of claim 1, wherein the generating the luma reference samples comprises, when a look-up table is used as the first function, generating an index for the look-up table using a bitdepth of the current block, extracting a median value based on the index, and using the median value as a value of the luma reference samples.

4. The method of claim 1, wherein the generating the luma reference samples comprises, when the luma signals are present in the original area but the luma mapping function is used, calculating a median value based on a maximum value and a minimum value generated by the second function and using the median value as a value of the luma reference samples.

5. The method of claim 1, further comprising:
generating the luma reference samples for the current block by using the luma mapping function when neighboring restoration samples of a higher data unit including the current block are not available while the second flag is activated;
generating a chroma residual scaling value by using the luma reference samples; and
generating chroma residual signals by multiplying the scaled chroma residual signals by the chroma residual scaling value.

6. The method of claim 5, wherein the generating the luma reference samples comprises calculating a median value based on a maximum value and a minimum value generated by the first function and comprises using the median value as a value of the luma reference samples.

7. The method of claim 5, wherein the generating the luma reference samples comprises, when the look-up table is used as the first function, generating the index for the look-up table by using the bitdepth of the current block, extracting a median value based on the index, and using the median value as a value of the luma reference samples.

8. The method of claim 5, wherein the generating the luma reference samples comprises, when the luma signals are present in the original area but the luma mapping function is used, calculating a median value based on a maximum value and a minimum value generated by the second function and using the median value as a value of the luma reference samples.

9. The method of claim 1, wherein the LMCS parameters as a part of an adaptation parameter set (APS) are transferred to the video decoding apparatus, and wherein the APS is a separate parameter set applied to parameters applied to one or multiple pictures or one or multiple slices.

10. The method of claim 1, further comprising:
obtaining a third flag indicating whether a matrix-based intra prediction mode is activated from the bitstream, wherein, the MIP mode is an intra prediction method for the current block using a matrix operation; and
generating a reference sample by changing an offset used for the matrix operation of the MIP mode when the third flag is activated.

11. The method of claim 10, wherein the generating the reference sample comprises changing the offset by calculating a median value based on a maximum value and a minimum value generated by the first function.

12. The method of claim 10, wherein the generating the reference sample comprises, when the look-up table is used as the first function, generating the index for the look-up table by using the bitdepth of the current block and extracting a median value based on the index to change the offset.

13. The method of claim 1, further comprising:
obtaining a fourth flag indicating whether cross component linear model (CCLM) prediction is activated, from the bitstream, wherein the CCLM prediction is an intra prediction method for a chroma block for the current block based on a linear model indicating a similarity between the luma signals and chroma signals; and applying the second mapping function to a luma block corresponding to the chroma block and neighboring luma signals of the luma block when the fourth flag is activated.

14. A video encoding method for a current block in a current picture, (Original) which is performed by a video encoding apparatus, the method comprising:
obtaining a luma mapping chroma scaling (LMCS) parameters, a first flag indicating whether LMCS is activated, and a second flag indicating whether chroma residual scaling is activated for the current picture, wherein the LMCS converts the luma signals between an original area and a mapping area of luma signals;
obtaining the current block;
generating a luma mapping function of converting a dynamic area of the luma signals by using the LMCS parameters when the first flag is activated, wherein the luma mapping function indicates a first function of converting the luma signals into the mapping area or a second function of inversely converting the mapped luma signals into the original area;
generating luma reference samples for the current block by using the luma mapping function when neighboring restoration samples of the current block are not available;
generating luma predicted samples by performing intra prediction for the current block based on the luma reference samples; and
generating luma residual signals by subtracting the luma prediction samples from the current block.

15. The method of claim 14, further comprising:
generating the luma reference samples for the current block by using the luma mapping function when neighboring restoration samples of a higher data unit including the current block are not available while the second flag is activated;
generating a chroma residual scaling value by using the luma reference samples; and
generating scaled chroma residual signals by dividing the chroma residual signals of the current block by the chroma residual scaling value.

16. An intra prediction method for a current block, which is performed by a computing device, the method comprising:
obtaining luma mapping chroma scaling (LMCS) parameters and a first flag indicating whether LMCS is activated from a bitstream, wherein the LMCS is a method for converting the luma signals between an original area and a mapping area of luma signals;
generating luma residual signals from the bitstream;
generating a luma mapping function of converting a dynamic area of the luma signals by using the LMCS parameters when the first flag is activated;
generating luma reference samples for the current block by using the luma mapping function when neighboring restoration samples of the current block is not available; and
generating luma prediction samples by performing intra prediction for the current block based on the luma reference samples.

* * * * *